United States Patent

Hoffmann

[11] Patent Number: 5,936,946
[45] Date of Patent: Aug. 10, 1999

[54] MEASURING DEVICE FOR THE INTERFACE OF A TRANSMISSION PATH WITH FULL-DUPLEX TRANSMISSION IN THE COMMON CARRIER DUPLEX PROCESS

[75] Inventor: Klaus Hoffmann, Munich, Germany

[73] Assignee: Tetronix, Inc., Wilsonville, Oreg.

[21] Appl. No.: 08/765,562

[22] PCT Filed: Jun. 20, 1995

[86] PCT No.: PCT/DE95/00836

§ 371 Date: Aug. 22, 1997

§ 102(e) Date: Aug. 22, 1997

[87] PCT Pub. No.: WO95/35607

PCT Pub. Date: Dec. 28, 1995

[30] Foreign Application Priority Data

Jun. 21, 1994 [DE] Germany ............................ 44 23 333

[51] Int. Cl.$^6$ ................................ H04B 1/56; H04L 5/14
[52] U.S. Cl. ............................................ 370/276; 370/284
[58] Field of Search .................................... 370/241, 276, 370/252, 280, 281, 282, 283, 284, 286, 287, 288, 293, 294, 295

[56] References Cited

U.S. PATENT DOCUMENTS

| | | | |
|---|---|---|---|
| 4,604,740 | 8/1986 | Gandini et al. | 370/284 |
| 4,638,473 | 1/1987 | Cooperman et al. | 370/284 |
| 5,216,667 | 6/1993 | Chu et al. | 370/284 |
| 5,502,716 | 3/1996 | Rhebergen | 370/284 |
| 5,579,336 | 11/1996 | Fitzgerald et al. | 370/284 |

*Primary Examiner*—Ajit Patel
*Attorney, Agent, or Firm*—Richard L. Mayer; Thomas F. Lenihan

[57] ABSTRACT

A measuring device for the interface of a transmission path with full-duplex transmission in the common carrier duplex process. A highly integrated interface unit is connected to the interface via a hybrid set and a transmitter on one side. A line termination or a network termination is connected as the test object on the other side. In order to perform measurements on the test object with such a measuring device relatively easily and accurately, a device simulating the arrangement of a hybrid set, a transmitter and a line or network termination is provided and with its connected to the highly integrated interface unit via a high-resistance differential amplifier, and its output connected to an input of a subtractor. Another input of the subtractor is connected to the interface via an additional differential amplifier. The output of the subtractor is connected to a measurement system.

4 Claims, 3 Drawing Sheets

… (5,936,946)

MEASURING DEVICE FOR THE INTERFACE OF A TRANSMISSION PATH WITH FULL-DUPLEX TRANSMISSION IN THE COMMON CARRIER DUPLEX PROCESS

FIELD OF THE INVENTION

The present invention relates to full-duplex transmission path interface measuring devices.

BACKGROUND INFORMATION

As described in U.S. Pat. No. 4,989,202, an ISDN (integrated services digital network) transmission path between the transmission line and a network has an interface. It is also known (see "Siemens KMT Report," no. 14, order no. E 80001-V331-W54, pages 6 and 7) that measurements can be performed on this interface and an appropriate measuring device can be provided for this purpose. For example, frequency-dependent measurements, functional tests and even jitter measurements can be performed with this measuring device. An ISDN data transmission line is a special form of a transmission line with full-duplex transmission in the common carrier duplex process.

According to European Patent Application No. 9,592 A1, a differential unit in a transmission and receiving device connected to a duplex line is provided for receiving signals. Two signals are sent to this differential unit, namely the transmission signal of its own transmission and receiving device and the complete signal that is transmitted on the duplex line and which consists of its own transmission signal plus a signal to be received from another transmission device. The task of the differential unit is to subtract its own transmission signal from the composite signal of the duplex line and in this way to make it possible to receive only the signal of the other transmission device. Thus, cross-talk from its own transmission signal to the received signal is suppressed.

SUMMARY OF THE INVENTION

The present invention relates to a measuring device for the interface of a transmission path with full duplex transmission in the common carrier duplex process, whereby a highly integrated interface unit is connected to the interface via a hybrid set and a transmitter on the one hand and a line termination (LT) or a network termination (NT) as the test object on the other hand.

An object of the present invention is to provide a means to accurately and simply perform physical measurements on the interface during transmission operation. This object is achieved according to the present invention by providing a device that simulates the arrangement consisting of a hybrid set, a transmitter and a line or network termination and which contains a high-resistance differential amplifier that is connected at the input to the transmission outputs of the highly integrated interface unit and at the output to an input of a subtractor via another high-resistance differential amplifier. Another input of the subtractor is connected to the interface via an additional high-resistance differential amplifier, and a measurement system of the measuring device is connected to the output of the subtractor.

An important advantage of the measuring device according to the present invention is that by using the simulating device and the subtractor, it is possible to analyze only the signal transmitted by the respective test object because the signals going to the test object and information in the subtractor are filtered out, so that only the signal sent by the measurement object is available and can be analyzed easily by a measurement system of the measuring device.

With the measuring device of the present invention, the device simulating the arrangement of a hybrid set, a transmitter and a line or network termination may have various designs. It is particularly advantageous—for the purpose of substantially eliminating the signals sent to the test object—if the simulating device has a hybrid set identical to the hybrid set of the transmission path, a transmitter identical to the transmitter of the transmission path and a termination with electric properties identical to those of the line or network termination of the transmission path.

To achieve the advantages of the measuring device of the present invention even when the transmission path has an attenuating device at the interface, it is advantageous for the simulating device of the measuring device to have, between the identical transmitter and the identical termination, an attenuating device with the same electric properties as the attenuating device of the transmission path.

It may also be advantageous to have an attenuation arrangement with effects identical to those of the attenuation device of the transmission path connected downstream from the additional high-resistance differential amplifier in a transmission path with an attenuation device at the interface in the device simulating the measuring device.

DETAILED DESCRIPTION

Figure 1:
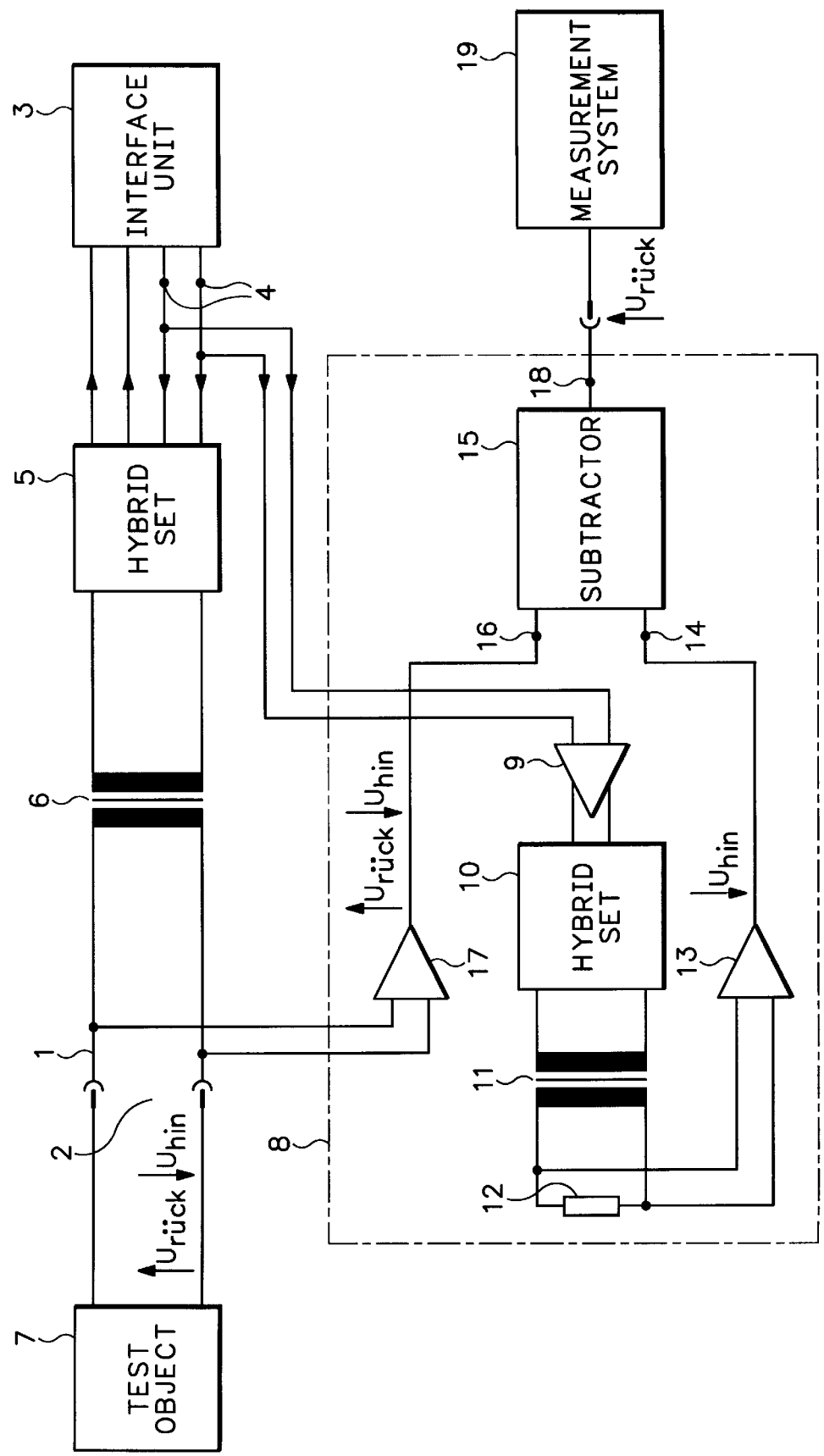
FIG. 1 shows an embodiment of a measuring device according to the present invention.

FIG. 1 shows a transmission path 1 with an interface 2, which may be an interface of an ISDN transmission path, for example, with full duplex transmission in the common carrier duplex process. A highly integrated interface unit 3 is connected at the interface in a known way. Specifically, the highly integrated interface unit 3 is connected via two transmission outputs 4 to a hybrid set 5. Hybrid set 5 is connected via a downstream transmitter 6 to interface 2 to which a test object 7 is also connected. This test object may be a line termination (LT) or a network termination (NT).

As FIG. 1 also shows, a device 8 containing a high-impedance differential amplifier 9 at the input end is connected to transmission outputs 4 of the highly integrated interface unit 3. Downstream from the differential amplifier 9 is a hybrid set 10 whose electric properties are identical to those of hybrid set 5 of transmission path 1. A transmitter 11 downstream from the identical hybrid set 10 is also the same as transmitter 6 of transmission path 1. A termination 12 whose electric properties are identical to those of test object 7 is connected to the transmitter 11. At the input of the identical termination 12 is connected another high-impedance differential amplifier 13 whose output is connected to an input 14 of a subtractor 15.

Another input 16 of subtractor 15 is connected to interface 2 via an additional high-impedance differential amplifier 17.

A measurement system 19 of the measuring device is connected to an output 18 of subtractor 15 and may be suitable for performing jitter measurements, for example.

In the area of interface 2 in FIG. 1, an arrow with the designation $U_{outward}$ indicates that a signal transmitted from the interface unit 3 via hybrid set 5 and transmitter 6 to test object 7 is available at interface 2 and thus also at the output of the additional differential amplifier 17. Furthermore, the signal $U_{return}$ sent back is available at interface 2. Both signals $U_{outward}$ and $U_{return}$ are available at the output of the additional differential amplifier 17, because it has a gain of 1, and are detected via input 16 of subtractor 15. However, only signal $U_{outward}$ delivered at transmission outputs 4 of highly integrated interface unit 3 is sent to input 14 of subtractor 15 via differential amplifier 9, identical hybrid set 10, identical transmitter 11 and the additional high-resistance amplifier 13. Therefore, due to the formation of a difference, only the $U_{return}$ signal which contains information from or regarding test object 7 appears at output 18 of subtractor 15. The signal $U_{return}$ can thus can be analyzed by measurement system 19, for example, for phase jitter. Therefore, the $U_{outward}$ signal does not interfere with measurement system 19.

Figure 2:
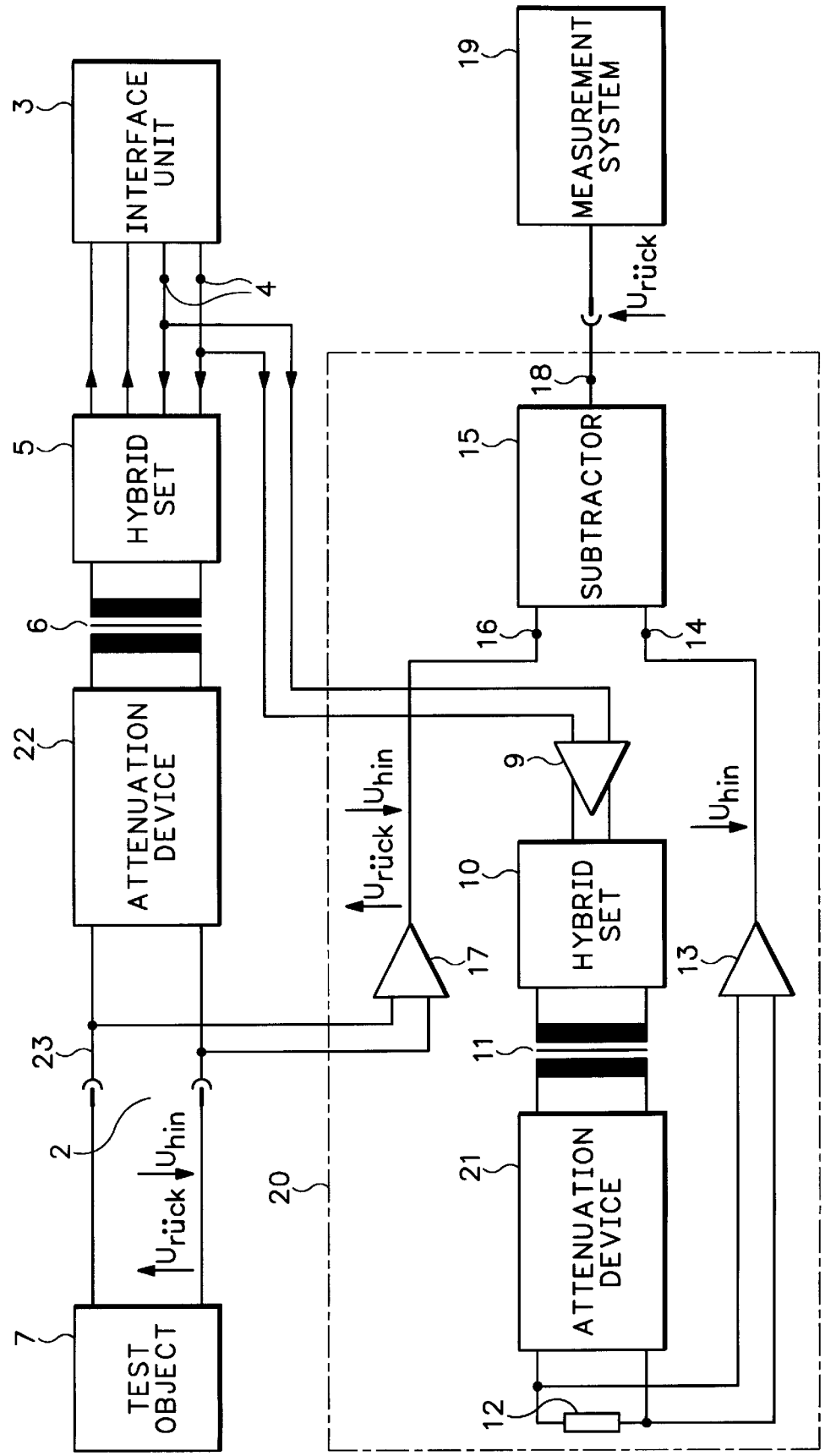
FIG. 2 shows another embodiment of a measuring device according to the present invention in an ISDN (integrated services digital network) transmission path equipped with an attenuation device.

The embodiment of FIG. 2, in which components corresponding to those in the embodiment of FIG. 1 are labeled with the same notation, differs from that in FIG. 1 in that an attenuation device 21 identical to the attenuation device 22 in transmission path 23 between the transmitter 6 and interface 2 is provided between the identical transmitter 11 and termination 12 in the simulating device 20. The identical attenuation device 21 assures that a signal $U_{outward}$ that corresponds to the signal $U_{outward}$ at interface 2 is sent to input 14 of subtractor 15. Only the signal $U_{return}$ is measured by the measurement system.

Figure 3:
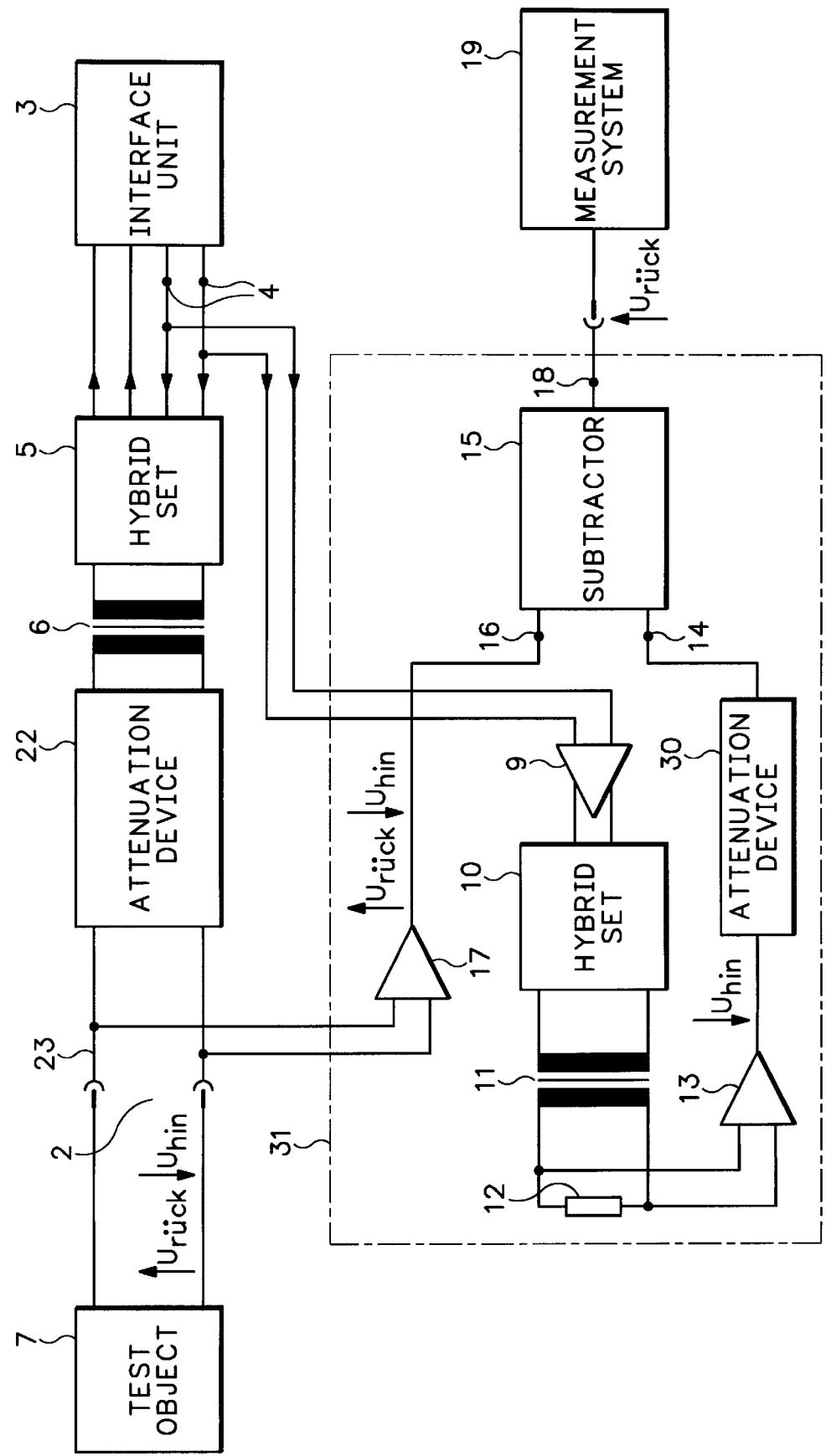
FIG. 3 shows an additional embodiment of the measuring device according to the present invention in an ISDN (integrated services digital network) transmission path equipped with an attenuation device.

The embodiment according to FIG. 3 differs from that of FIG. 2 only in that an attenuation arrangement 30 with the same electric properties as attenuation device 22 is connected to the output of the additional high-resistance differential amplifier 13 in a simulating device 31, which thus again assures that a signal $U_{outward}$ which corresponds to a matching signal at interface 2 is available at input 14 of subtractor 15 so that only the signal $U_{return}$ of test object 7 is provided at output 18 of subtractor 15.

I claim:

1. A measurement circuit for an interface of a transmission path with full duplex transmission, wherein an interface unit is coupled to the interface via a first hybrid set and a first transformer and wherein a termination is coupled to the interface, the measuring circuit comprising:

a simulation circuit including:
   a first differential amplifier with inputs coupled to transmission outputs of the interface unit;
   a second hybrid set coupled to an output of the first differential amplifier;
   a second transformer with a first side coupled to an output of the second hybrid set;
   a second differential amplifier with inputs coupled to a second side of the second transformer;
   a subtractor with a first input coupled to an output of the second differential amplifier;
   a third differential amplifier with inputs coupled to the interface and an output coupled to a second input of the subtractor; and
   a measurement device coupled to an output of the subtractor,
wherein the simulation circuit substantially simulates the arrangement of the first hybrid set, the first transformer and the termination.

2. The measurement circuit of claim 1, wherein:

the second hybrid set is substantially similar to the first hybrid set;

the second transformer is substantially similar to the first transformer; and the measurement circuit comprises a further termination with electrical properties substantially similar to those of the termination coupled to the interface.

3. The measurement circuit of claim 2, wherein:

the transmission path includes a first attenuation device arranged between the interface and the first transformer; and the measurement circuit includes a second attenuation device arranged between the second transformer and the further termination, the second attenuation device having electrical properties substantially similar to those of the first attenuation device.

4. The measurement circuit of claim 2, wherein:

the transmission path includes a first attenuation device arranged between the interface and the first transformer; and the measurement circuit includes a second attenuation device arranged between the output of the second differential amplifier and the first input of the subtractor, the second attenuation device being substantially similar in effect to the first attenuation.

* * * * *